US012790036B2

(12) United States Patent
Stevens

(10) Patent No.: US 12,790,036 B2
(45) Date of Patent: Nov. 10, 2026

(54) SYSTEMS AND METHODS FOR CENTRIPETAL ACCELERATION

(71) Applicant: Peter Stevens, Addison, IL (US)

(72) Inventor: Peter Stevens, Addison, IL (US)

( * ) Notice: Subject to any disclaimer, the term of this patent is extended or adjusted under 35 U.S.C. 154(b) by 142 days.

(21) Appl. No.: 18/638,506

(22) Filed: Apr. 17, 2024

(65) Prior Publication Data

US 2025/0326505 A1 Oct. 23, 2025

(51) Int. Cl.
*B64G 1/60* (2006.01)
*F28B 1/00* (2006.01)
*G01M 1/36* (2006.01)

(52) U.S. Cl.
CPC .................. *B64G 1/60* (2013.01); *F28B 1/00* (2013.01); *G01M 1/365* (2013.01)

(58) Field of Classification Search
CPC ... B64G 1/60; B64G 1/46; B64G 1/12; B64G 1/465; B64G 2007/005; B64G 7/00; F28B 1/14; G01M 1/365; E03C 1/14; E03C 1/324; E03C 2201/90; B64D 11/02; Y02T 50/40; B23P 17/04; E05D 15/02
See application file for complete search history.

(56) References Cited

U.S. PATENT DOCUMENTS 3,329,947 A * 7/1967 Larrowe .................. G09G 1/10 341/99
3,340,544 A * 9/1967 Cella ........................ B64G 1/60 4/316
3,405,409 A * 10/1968 Bennett .................... B64G 1/60 4/315
4,643,375 A * 2/1987 Allen ..................... B64G 1/465 244/171.9
5,052,932 A * 10/1991 Trani ....................... G09B 9/32 472/130
6,042,382 A * 3/2000 Halfhill .................... A63G 1/26 472/39
6,325,012 B1 * 12/2001 Aristizabal ............. B63C 11/34 114/314
7,886,557 B2 * 2/2011 Anderson ........... B01D 5/0072 62/272
8,931,741 B1 * 1/2015 Kilchichakov .......... B64G 7/00 244/159.4
9,776,743 B2 * 10/2017 Dharmaraj ........... B64G 1/2227
2002/0074457 A1 * 6/2002 Barutt ...................... B64G 1/12 244/171.9
2006/0163434 A1 * 7/2006 Patel ........................ B64G 1/10 244/158.3

(Continued)

FOREIGN PATENT DOCUMENTS

EP 1600377 A2 * 11/2005 ............. B64D 41/00
ES 2339523 A1 * 5/2010 ............. F25B 41/00

(Continued)

*Primary Examiner* — Emmanuel E Duke
(74) *Attorney, Agent, or Firm* — Foley & Lardner LLP

(57) ABSTRACT

An apparatus can be rotated to generate centripetal acceleration to perform water-related activities. The apparatus can comprise a cylindrical device with one or more compartments, a water condensation unit, a balancing unit, and a power unit. A toilet, a shower, and a washer and/or dryer can be disposed within the one or more compartments. The apparatus can be used in zero-gravity environments or micro-gravity environments.

19 Claims, 9 Drawing Sheets

(56) References Cited

U.S. PATENT DOCUMENTS

| | | | | |
|---|---|---|---|---|
| 2014/0124626 A1* | 5/2014 | Clay | ....................... | B23P 17/04<br>244/159.3 |
| 2022/0313013 A1* | 10/2022 | Sears | ...................... | A47J 36/32 |

FOREIGN PATENT DOCUMENTS

| | | | | | |
|---|---|---|---|---|---|
| JP | 2013212463 | A | * 10/2013 | | |
| KR | 200369168 | Y1 | * 12/2004 | ............... | F24H 9/02 |

* cited by examiner

SYSTEMS AND METHODS FOR CENTRIPETAL ACCELERATION

TECHNICAL FIELD

The present application relates generally to a device for generating centripetal acceleration in zero-gravity environments or micro-gravity environments.

BACKGROUND

Rotation of a device can generate centripetal acceleration.

SUMMARY

One aspect of the present disclosure is directed towards a system. The system can include a device. The device can be disposed in a craft. The device can include an outer cylindrical wall coupled to a side panel and one or more walls. The one or more walls can form one or more compartments. The system can include a water condensation unit coupled to the one or more compartments. The water condensation unit can be configured to condense gaseous water. The system can include a balancing unit coupled to the device. The balancing unit can be configured to counteract an angular momentum imparted on the craft generated by the device. The system can include a power unit coupled to the device.

In some implementations, a shower can be disposed in the one or more compartments. In some implementations, one of a washer and dryer can be disposed in the one or more compartments. In some implementations, a toilet can be disposed in the one or more compartments. In some implementations, the device can move liquid water to different portions of the device to counteract instantaneous changes of load.

Another aspect of the present disclosure is directed towards the water condensation unit. The water condensation unit can include a housing enclosing a cooling and condensing portion and a draining portion, the cooling and condensing portion and the draining portion separated by a membrane, a condensation tube including a first segment and a second segment disposed within the housing, an inlet coupled to the condensation tube, a first outlet coupled to the condensation tube, a second outlet coupled to draining portion, an opening disposed between the first segment of the condensation tube and the second segment of the condensation tube, a portion of the draining portion that receives water from the opening, and one or more protrusions coupled with the opening.

In some implementations, the cooling and condensing portion can include a cooling fluid which can be configured to circulate around a portion of the first segment of the condensation tube and a portion of the second segment of the condensation tube. In some implementations, one or more fans can be configured to move gaseous water and air into the inlet. In some implementations, the condensation tube can conduct heat. In some implementations, the condensation tube can have a straight shape. In some implementations, the condensation tube can have a helical shape. In some implementations, the opening can be a first opening and the condensation tube can include a third segment and include a second opening disposed between the second segment of the condensation tube and the third segment of the condensation tube, the first opening has a first diameter, and the second opening has a second diameter, the second diameter different from the first diameter.

In some implementations, the one or more protrusions can have a first diameter and a second diameter, the second diameter less than the first diameter. In some implementations, a device coupled to the condensation tube can change a pressure in the condensation tube. In some implementations, the one or more protrusions can include hydrophilic material. In some implementations, a device coupled to the condensation tube can provide an electrical charge to the one or more protrusions. In some implementations, a volume of space disposed between the membrane and the portion of draining portion can receive water and collects gaseous air and water that escapes from the opening.

Another aspect of the present disclosure is directed towards a method. The method can include rotating, an apparatus. The apparatus can include a device including an outer cylindrical wall coupled to a side panel and one or more walls, wherein the one or more walls form one or more compartments, a water condensation unit coupled to the one or more compartments, a balancing unit coupled to the device, and a power system coupled to the device.

In some implementations, the apparatus can be disposed in a rotating environment. In some implementations, the rotating environment can be a spacecraft.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
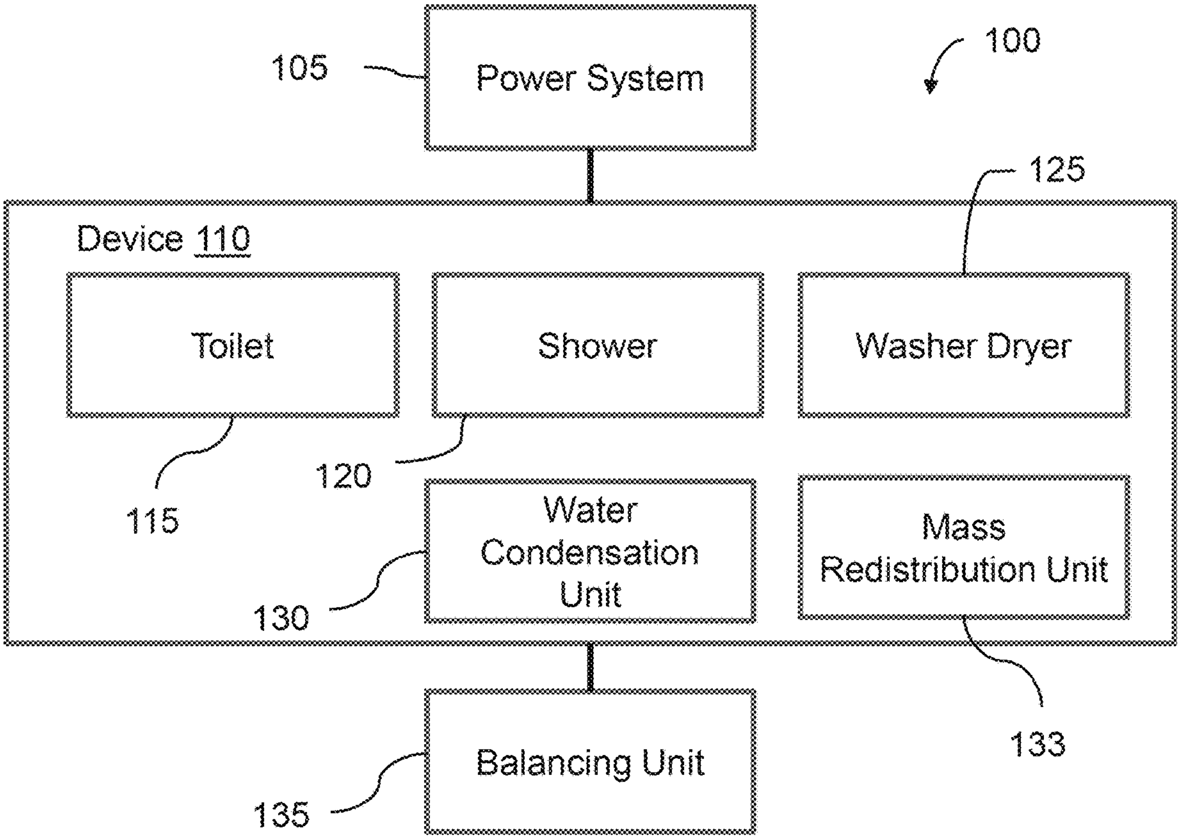
FIG. 1 is a schematic overview of the system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Before turning to the figures, which illustrate certain exemplary embodiments in detail, it should be understood that the present disclosure is not limited to the details of methodology set forth in the description or illustrated in the figures. It should also be understood that the terminology used herein is for the purpose of description only and should not be regarded as limiting.

The present disclosure is directed to systems and methods for generating centripetal acceleration to perform water-related activities. Within the International Space Station (ISS) and other spacecrafts, a method for astronauts to shower, urinate, and/or defecate in a similar manner to that in normal gravity conditions (i.e., on Earth) or a normal way can be lacking. A lack of gravity can cause floating and other conditions which can make it difficult to shower, urinate, and defecate in the normal way. A method to wash and dry clothes on the ISS can also be lacking. The method can involve a disposal of clothing and a limited supply of clean clothing. An unpleasant body odor can be generated by astronauts resulting from an inability to perform personal hygiene tasks.

Systems and methods of the present technical solution can allow astronauts and others in zero-gravity environments or micro-gravity environments to perform water-related activities. The system can include a cylindrical device that rotates. The cylindrical device can include compartments. The cylindrical device can include a shower, a toilet, and a washer and/or dryer disposed within the compartments. The system can include a water condensation unit to condense water vapors generated by the water-related activities. The system can include a balancing unit to counteract angular momentum generated by the cylindrical device.

Solutions disclosed herein can have a technical advantage of allowing astronauts and others in zero-gravity environments or micro-gravity environments to perform water-related activities in a normal (e.g., on Earth) way. For example, the solution can include systems and methods for washing and drying clothes. The solution can allow users to shower in a normal way (e.g., standing under a faucet that outputs water). The solution can allow users to urinate and defecate in a toilet (e.g., Western toilet) in a normal way (e.g., sit on a seat of a toilet). The solution can include systems and methods to condense water vapors generated from the aforementioned activities.

FIG. 1 shows the schematic overview of a system 100. The system 100 can be a system that utilizes centripetal acceleration, adhesion forces, and/or surface tension to perform activities (e.g., water-related activities, water-related actions). For example, water-related activities can include showering, using a toilet, and/or doing laundry. The system 100 can be housed on a spacecraft or an apparatus in a zero-gravity environment or micro-gravity environments. The zero-gravity environment or micro-gravity environments can be real. The zero-gravity environment or micro-gravity environments can be simulated.

The system 100 can include one or more devices 110. For example, the one or more devices 110 can be a generally cylindrical shape. The device 110 can have a radius. The device 110 can have a height. The device 110 can rotate. The device 110 can be housed on a rotating spacecraft or apparatus in a zero-gravity environments or micro-gravity environments. The device 110 can rotate by a rotation of the spacecraft or the apparatus in the zero-gravity environments or micro-gravity environments. The device 110 can generate a centripetal acceleration when rotating. The device 110 can spin about its axis of rotation with an angular velocity. The angular velocity can be in a range from 0.5 to 2 radians per second. A rotation of the device 110 can generate a centripetal acceleration which can simulate gravity. The rotation of the device 110 can generate a radial centripetal acceleration.

The system 100 can include one or more toilets 115. For example, the toilet 115 can include a toilet bowl. A stream of urine and fecal matter can follow a short and/or curved path into the toilet 115. The urine and fecal matter can be pumped out of the toilet 115 and recycled. The urine and fecal matter can fall towards a pool of water disposed in the toilet 115. The pool of water can be held in a shape by a shape of a bowl of the toilet 115. The pool of water can be held in the shape by the centripetal acceleration. A user can sit on the toilet 115.

The system 100 can include one or more showers 120. For example, the shower 120 can include a stream of water. The shower 120 can allow a user to stand, sit, and/or be under the stream of water. The stream of water can be ejected (e.g., released) from the shower 120. The stream of water can travel in a curved trajectory. The stream of water can be controlled by a water pump. A volume and velocity of a flow of the stream of water can be controlled by the water pump and the user. The shower 120 can include a showerhead. The stream of water can originate from and/or be released from the showerhead. The stream of water can move in a straight or curved direction. Angular rotation for the device 110 can determine a relative curvature of a path of the stream of water. Linear velocity of the stream of water can determine the relative curvature of the path of the stream of water. The angular rotation and the linear velocity can adjust the stream of water (e.g., the stream of water hitting a portion of a body of the user). The showerhead can be released from a position and/or be handheld (e.g., held by the user which can allow for the user to control the path of the stream of water).

The system 100 can include one or more washer dryers 125. For example, the washer dryer 125 can include a washing machine (e.g., washer). The washing machine can include an apparatus that can wash material (e.g., clothes). Wastewater generated by the washing machine can be collected by the device 110. The wastewater can be processed, filtered, and/or recycled. The washer dryer 125 can include a drying machine (e.g., dryer). The drying machine can include an apparatus that can dry material. The drying machine can include a cylindrical apparatus. The cylindrical apparatus can include a chamber (e.g., drum) where clothes can be disposed, rotated, and/or heated. The drying machine can heat the material by blowing hot air into the cylindrical apparatus. The hot air can allow water to evaporate from the material.

The system 100 can include one or more water condensation units 130. For example, the water condensation unit 130 can condense water generated from the shower 120, the washer dryer 125, and/or any water vapors in and around the system 100. The water condensation unit 130 can convert evaporated water to liquid water. The water condensation unit 130 can recycle and/or filter converted liquid water and deliver the converted liquid water to the device 110. The water condensation unit 130 can be disposed in the device 110. The water condensation unit 130 can be coupled to the device 110. The water condensation unit 130 can be coupled to the device 110 by a connection (e.g., tube), in contact with, and/or welded to the device 110. The water condensation unit 130 can be coupled to the shower 120 and/or the washer dryer 125. The water condensation unit 130 can be coupled to the shower 120 and/or the washer dryer 125 by a connection (e.g., tube), being connected to, in contact with, and/or welded. Water vapors and hot air can be taken from the cylindrical apparatus of the shower 120 and the washer dryer 125 and blown into the water condensation unit 130. The water condensation unit 130 is further depicted in FIGS. 4-6.

The system 100 can include one or more mass redistribution units 133. For example, the mass redistribution unit 133 can redistribute a mass to balance the system 100. The device 110 can include one or more chambers in which mass is redistributed to balance the system 100. An instantaneous change of a load the device 110 can occur. The instantaneous change of load of the device 110 can occur when a center of mass of the device 110 changes. The instantaneous change of load of the device 110 can occur when the user steps on the device 110 and/or the stream of water outputs water. The device 110 can be unbalanced and/or have unequal loads on different portions of the device 110 when the instantaneous change of load occurs. The instantaneous change of load can cause the device 110 to be unstable (e.g., wobble). A wobble of the device 110 can be fixed by the mass redistribution unit 133. The wobble of the device 110 can be fixed by counteracting the instantaneous change of load. For example, the mass redistribution unit 133 can inject or remove a mass (e.g., liquid water) from the one or more chambers to stabilize the device 110. A distribution of liquid water into the one or more chambers can stabilize the device 110. The distribution of liquid water can counteract the instantaneous change of load. The distribution of liquid water can be strategic. The distribution of liquid water can be strategic to counteract the instantaneous change of load.

The system 100 can include one or more balancing units 135. For example, the balancing unit 135 can counterbalance (e.g., counteract) the angular momentum created (e.g., generated) by the rotation of the device 110 imparted to (e.g., applied to) the craft or the apparatus in the zero-gravity environments or micro-gravity environments. An angular velocity generated by the rotation of the device 110 can be in arc seconds per seconds. The angular velocity generated by the rotation of the device 110 can be in arc minutes per second. The craft can be a spacecraft, a vehicle, an enclosure, or a housing. The device 110 can be disposed in, on, or coupled to the craft. The device 110 can be coupled to the craft by being welded to the craft or being in contact with the craft. Rotation of the device 110 can create an undesirable angular velocity for the spacecraft or the apparatus in the zero-gravity environments or micro-gravity environments. The spacecraft or the apparatus in the zero-gravity environments or micro-gravity environments can rotate in a direction opposite to a direction of the angular velocity of the device 110 to conserve the angular momentum. The rotation of the spacecraft or apparatus can depend upon a size of the spacecraft or apparatus. The rotation of the spacecraft or apparatus can depend upon a location of the device 110 within the spacecraft or apparatus. The rotation of the spacecraft or apparatus can depend on the angular momentum of the device 110. The rotation of the spacecraft or apparatus can depend on a volume of the device 110. The balancing unit 135 can be smaller in size than the device 110. An angular velocity of the balancing unit 135 can be higher than the angular velocity of the device 110 to equalize an angular momentum of the balancing unit 135 and the device 110. The balancing unit 135 can be equal in size to the device 110. The balancing unit 135 can be bigger in size than the device 110. The balancing unit 135 can rotate in a direction opposite of the rotation of the device 110. The balancing unit 135 can adjust a rotation speed of the balancing unit 135 dependent on the rotation of the device 110, and the rotation of the spacecraft or apparatus. The balancing unit 135 can be dynamically activated. The balancing unit 135 can be activated upon usage of the device 110. The balancing unit 135 can be a cylindrical apparatus, a wheel, or any other apparatus that can rotate and has a moment of inertia.

The system 100 can include one or more power systems 105. For example, the power system 105 can provide power (e.g., energy, electricity) to the device 110. The power system 105 can be operatively coupled to the device 110. The power system 105 can be operatively coupled by a connection (e.g., wire), being in contact with, and/or welded to the device 110. The power system 105 can include solar panels. The power system 105 can utilize energy from the sun when the system 100 is located a distance away from the sun. The distance can be less than 4 astronomical units (AU). For example, the distance can be less than 4 AU or less than 3 AU. The power system 105 can generate electrical energy from solar panels to provide power to the device 110. For example, the power system 105 can generate energy to heat water, heat a dryer of the washer dryer 125, cool the water condensation unit 130, and/or power a rotation of the device 110 and the balancing unit 135. The device 110 can rotate by power provided by the power system 105. The power system 105 can utilize, use, and/or include nuclear power. Nuclear power can be used when the system 100 is located a distance away from the sun. The distance can be greater than 3 AU. For example, the distance can be greater than 3 AU or greater than 4 AU. The distance can be in a range of 3 AU to 5 AU. Nuclear power can be used when the distance is less than 3 AU. The power system 105 can include renewable energy sources (e.g., solar panels).

Figure 2A:
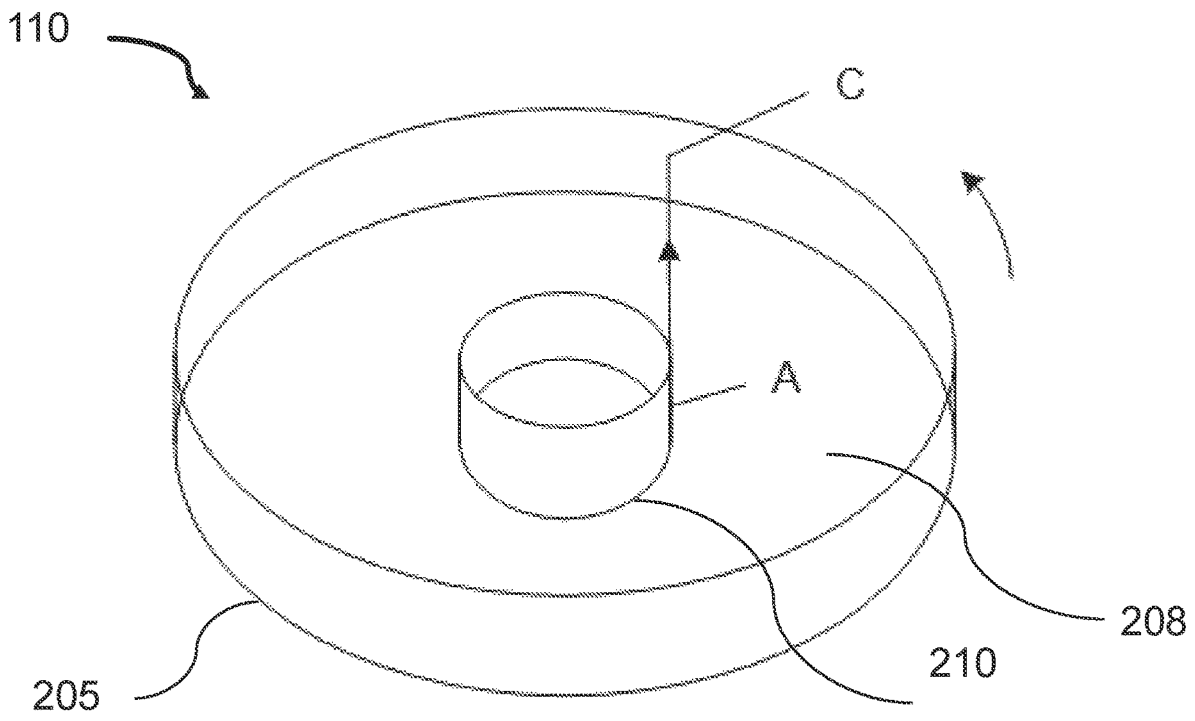
FIG. 2A is a device with a generally cylindrical shape with an inner and outer wall, according to an embodiment.
Figure 2B:
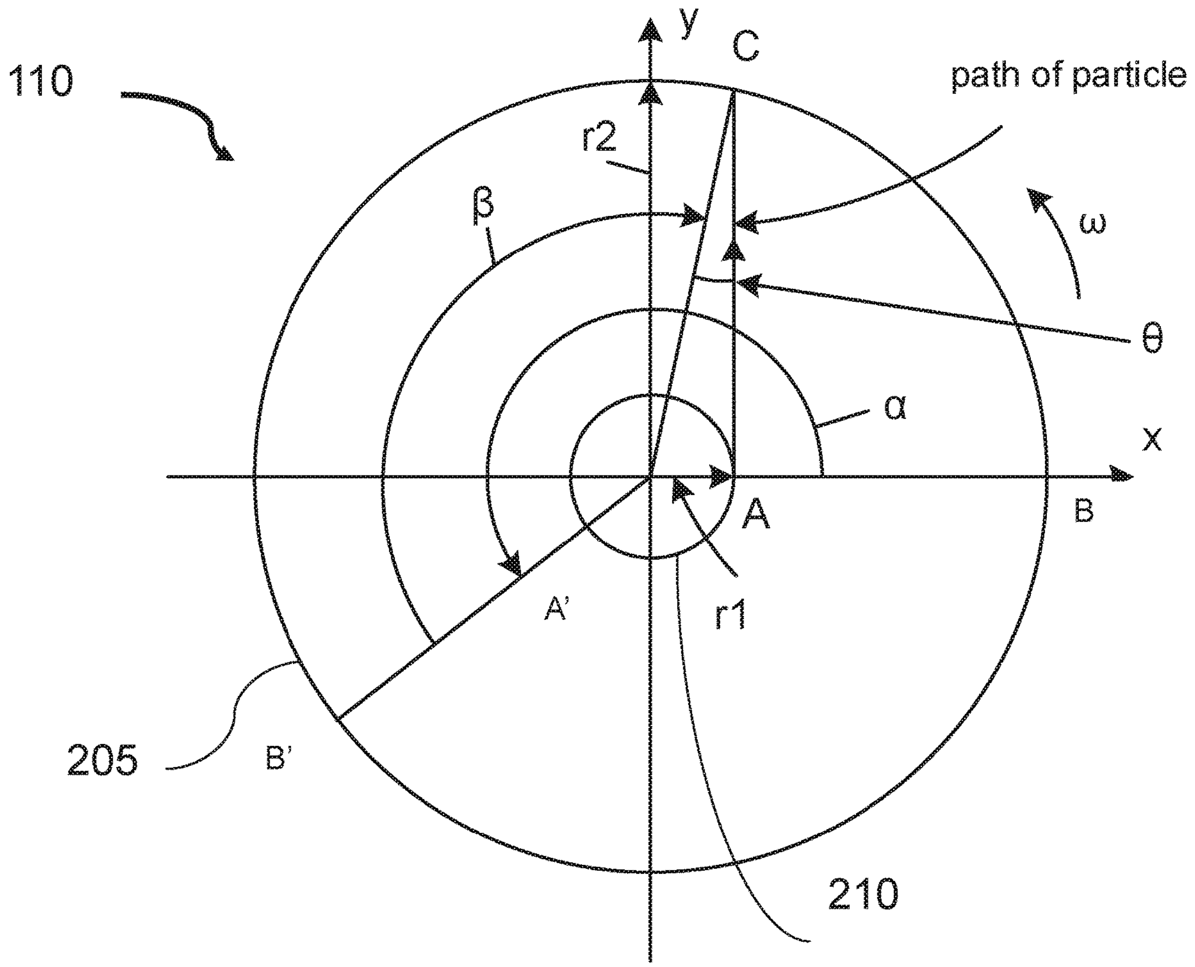
FIG. 2B is an inertial frame of reference of the movement of a particle of water, according to an embodiment.
Figure 2C:
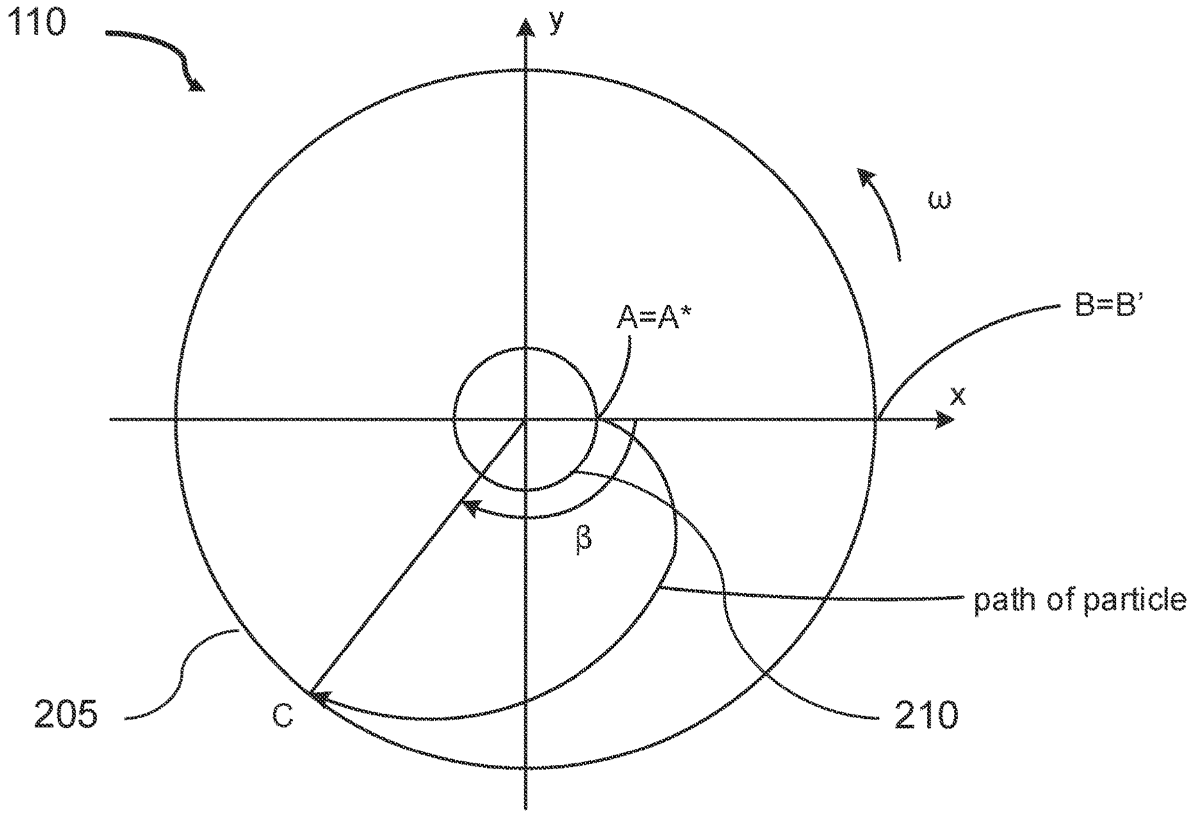
FIG. 2C is an accelerated frame of reference of the movement of the particle of water, according to an embodiment.

FIG. 2A-2C depict the device 110. FIGS. 2A-2C depict different perspectives of the device 110. The device 110 can include one or more outer walls 205. For example, the device 110 can include an outer wall 205. The outer wall 205 can include an outer cylindrical wall. The outer cylindrical wall can have a cylindrical shape. For example, an exterior surface of the device 110 can have a cylindrical shape. The outer wall 205 can be curved. The outer wall 205 can have a height. The outer wall 205 can be a bottom of the device 110 (e.g., the user stands on the outer wall 205). The outer wall 205 can be a virtual bottom. The virtual bottom can represent a bottom of the device 110 at any angle (e.g., the bottom of the device 110 while the device 110 is rotating). The outer wall 205 can be a floor of the device 110. The toilet 115 and the washer dryer 125 can be coupled to the outer wall 205. The toilet 115 can be coupled by being in contact with, screwed in, and/or attached to the outer wall 205. The washer dryer 125 can be coupled by being in contact with, screwed in, and/or attached to the outer wall 205. The shower 120 and the water condensation unit 130 can be coupled to the outer wall 205. The shower 120 can be coupled by being in contact with, screwed in, and/or attached to the outer wall 205. The water condensation unit 130 can be coupled by being in contact with, screwed in, and/or attached to the outer wall 205. Water can fall down towards the outer wall 205. The outer wall 205 can include the one or more chambers to redistribute mass to counteract the instantaneous change of load.

The device 110 can include a center point. The center point can be where the radius of the device 110 is equal to zero. The center point can be a virtual ceiling of the device 110. The virtual ceiling can represent a ceiling of the device 110 at any angle (e.g., the ceiling of the device 110 while the device 110 is rotating). The radial centripetal acceleration of the device 110 can point from the outer wall 205 to the center point. The radial centripetal acceleration can cause water to flow towards the outer wall 205.

The device 110 can include one or more inner walls 210. For example, the device 110 can include an inner wall 210. The inner wall 210 can include an outer cylindrical wall. The inner cylindrical wall can have a cylindrical shape. For example, an interior surface of the device 110 can have a cylindrical shape. The inner wall 210 can be curved. The inner wall 210 can have a height. The height of the inner wall 210 can be less than a height of the outer wall 205. The height of the inner wall 210 can be equal to the outer wall 205. The inner wall 210 can be omitted from the device 110. For example, feet of the user can be standing on the outer wall 205 and a head of the user can be facing the inner wall 210. The feet of the user can be standing on the outer wall 205 and the head of the user can be facing the center point.

The device 110 can have one or more side panels 208 (e.g., side walls). For example, the device 110 can include the side panel 208. The side panel 208 can be coupled to the outer wall 205 and the inner wall 210. For example, the side panel 208 can be connected to, in contact with, and/or welded to the outer wall 205 and the inner wall 210. The side panel 208 can have a circular shape. The side panel 208 can include the one or more chambers to redistribute mass to counteract the instantaneous change of load.

FIG. 2A is an angled view of the device 110. The device 110 can include one or more walls. The one or more walls can include the outer wall 205 and the inner wall 210. The device 110 can include the side panel 208. A point A and a point C can represent points at which a particle of water comes into contact with the outer wall 205 and the inner wall 210.

FIG. 2B is a top view of the device 110 at an inertial frame of reference. The inertial frame of reference can be the frame of reference that is not undergoing acceleration. A particle, droplet of water can be released from the inner wall 210 at the point A depicted in FIGS. 2A and 2B. The particle of water can start at point A and reach the point C on the outer wall 205 depicted in FIGS. 2A and 2B. During a time of release of the particle from point A until the particle reaches point C, the outer wall 205 can rotate from a point B to a point B' by an angle α as depicted in FIG. 2B. A rotation of the outer wall 205 can cause point A to rotate to point A'. The angle at which the outer wall 205 rotates can be β relative to the x-axis and the y-axis. For example, β can be an angle observed from the center of the device 110 in the accelerated frame between point C and point B'. Point C can be a final destination of the particle and point B' can be perceived as point B. r1 can be a radius of the inner wall 210. r2 can be a radius of the outer wall 205. r2 can be greater than r1. θ can be an angle relative to an x-axis and y-axis that the particle travels at from point A to point C.

FIG. 2C depicts the device 110 from an accelerated frame of reference at a top view. The accelerated frame of reference can be the frame of reference that is undergoing acceleration. From the accelerated frame of reference, the particle of water can appear to move in an opposite direction of the rotation of the device 110 and in a curved path. In the accelerated frame of reference, point A can be equal to point A' and point B can be equal to point B' which can indicate that from the accelerated frame of reference, rotation of the outer wall 205 is not seen and/or does not occur. An angle that the particle of water travels until it hits the outer wall 205 can be β relative to the x-axis and the y-axis. The particle of water can travel from point A to point C. The sweeping wall can be a surface immersed in the accelerated frame of reference. The user can be a sweeping wall. For example, the stream of water from the showerhead in the shower 120 can follow the curved path in FIG. 2C. The curved path in the accelerated frame of reference can be seen as a straight path in the inertial frame of reference by Newton's First Law. The water can adhere (e.g., stick) to the side panel 208, the outer wall 205, the inner wall 210, and/or the user. ω can be an angular velocity at which the device 110 rotates. The water can accelerate towards the outer wall 205 in the accelerated frame of reference. The water can accelerate towards the outer wall 205 after hitting a surface (e.g., the user).

Adhesion forces can make water adhere, stick to the user, the side panel 208, the inner wall 210, and/or the outer wall 205. Surface tension can keep water compact and can prevent water from scattering and can absorb kinetic energy of water particles and prevent the water particles from bouncing off a surface and becoming scattered or free. For example, surface tension can maintain an adhered state of the water. For example, water adhered to the side panel 208, inner wall 210, and/or the user can flow down to the outer wall 205 by a simulated gravity generated by the centripetal acceleration of the device 110. The water can be collected, pumped, filtered, stored, and/or recycled from the outer wall 205.

Figure 3:
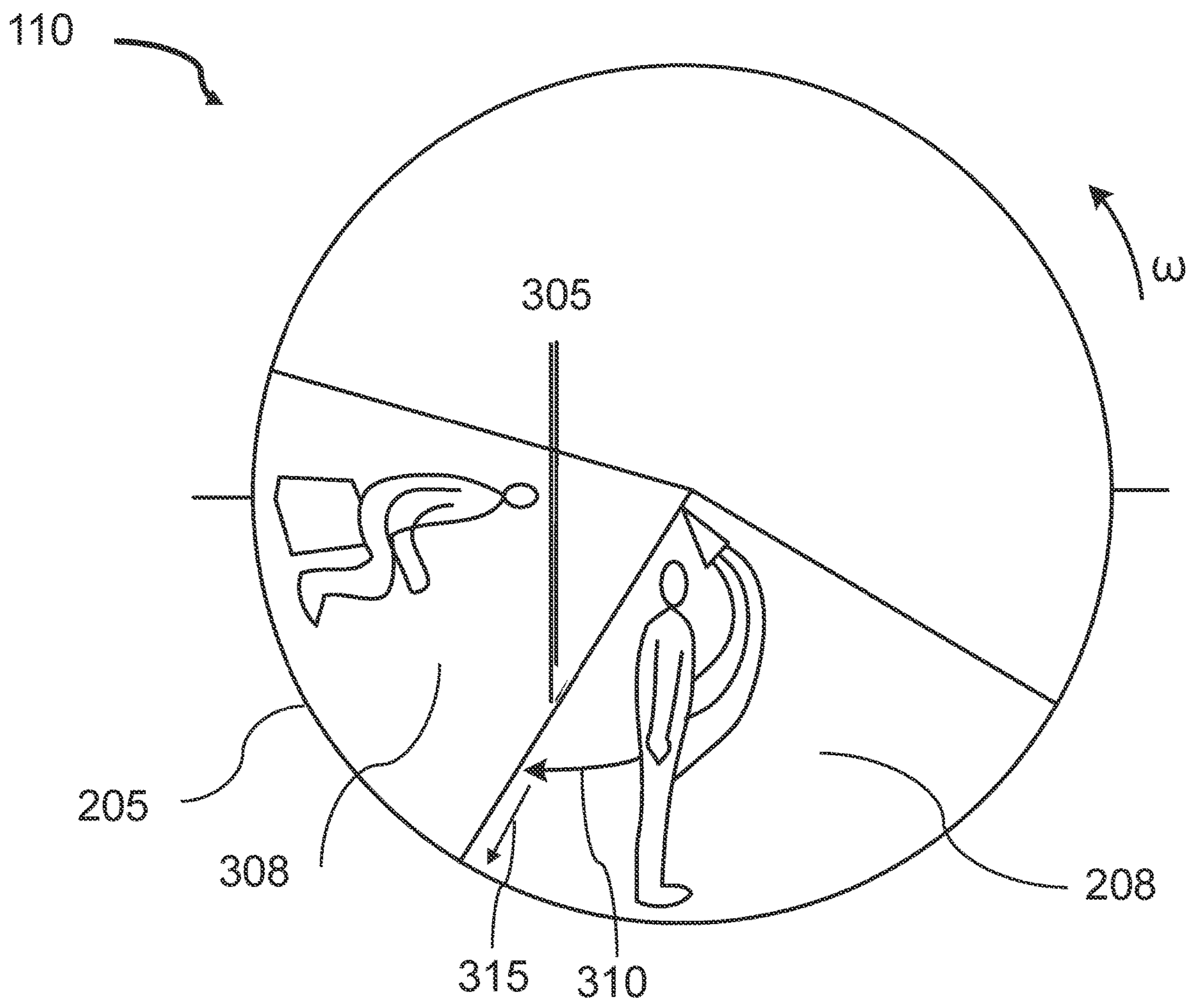
FIG. 3 is an aerial view of compartments within the device, according to an embodiment.

FIG. 3 depicts the device 110 from a top view. The water particle can accelerate radially outward reaching the outer wall 205 or the user using the shower 120 as depicted in FIG. 3. The stream of urine and fecal matter can follow a similar path reaching a rear wall of the toilet 115 and then going down to a bottom of the toilet 115 and subsequently the outer wall 205.

The device 110 can include the one or more walls. The one or more walls can be coupled to the outer wall 205. The one or more walls can be coupled to the inner wall 210. The one or more walls can be coupled to the side panel 208. The one or more walls can be coupled by being in contact with, connected, and/or welded to the outer wall 205, the inner wall 210, and the side panel 208. The one or more walls can have a height. The height of the one or more walls can be the height of the device 110.

The one or more walls can include one or more dividing walls 305. For example, the device 110 can include the dividing wall 305. The dividing wall 305 can divide and/or section portions of the device 110. The dividing wall 305 can be a sweeping wall. For example, the dividing wall 305 can sweep water down to the outer wall 205. The dividing wall 305 can sweep stray water from the shower 120. Water adhered to the dividing wall 305 can flow down to the outer wall 205. The dividing wall 305 can sweep water not absorbed by the user down to the outer wall 205. The dividing wall 305 can be coupled to the inner wall 210. The dividing wall 305 can be coupled to the outer wall 205. The dividing wall 305 can be coupled to the side panel 208. The dividing wall 305 can be coupled to the outer wall 205, the side panel 208, and the inner wall 210 by adhesion, welding, and/or being manufactured together. The dividing wall 305 can be coupled to another dividing wall 305. For example two or more dividing walls 305 can be coupled at the center point of the device 110. The one or more dividing walls 305 can form one or more compartments 308.

The device 110 can include one or more compartments 308. For example, the device 110 can include the compartment 308. The compartment 308 can be formed and/or constructed by the one or more dividing walls 305. The dividing wall 305 can separate (e.g., divide) the one or more compartments 308. The toilet 115, the shower 120, the washer dryer 125, and the water condensation unit 130 can be disposed in the one or more compartments 308. The one or more compartments 308 can be generally V-shaped. The one or more compartments 308 can form a generally V-shape where a narrow end of the one or more compartments 308 point towards a center of the device 110. The one or more compartments 308 can form a sector of the device 110 where the narrow end of the one or more compartments 308 point towards a center of the device 110 and an end opposite to the narrow end forms an arc. The one or more compartments 308 can have an angle and a radius. The one or more compartments 308 can be generally rectangular or square shaped. The one or more compartments 308 can have different shapes.

The device 110 can include a stream of water 310. The stream of water 310 can be output and/or from the shower 120. The stream of water 310 can be located opposite to the outer wall 205. The stream of water 310 can be located at the center point of the device 110. The stream of water 310 can hit the user, the dividing wall 305, the side panel 208, and/or the outer wall 205. The stream of water 310 can hit the user, the dividing wall 305, and/or the side panel 208 and flow down to the outer wall 205. The stream of water 310 can be adjusted by an initial velocity at ejection (e.g., by the showerhead) and by an angular velocity to hit any part of the outer wall 205, the one or more dividing walls 305, and/or the user as seen in FIG. 3. The initial velocity at ejection can have a range. The initial velocity at ejection can be in a range of 0.1 to 2 meters per second. A lower initial velocity (e.g., 0.5 meter per second) of ejection of the stream of water can result in a collision of the stream of water 310 at a point on the dividing wall 305 closer to the center point of the device 110. A higher initial velocity (e.g., 1.5 meters per second) of ejection of the stream of water 310 can result in a collision of the stream of water 310 at a point on the dividing wall 305 in contact with the outer wall 205. The initial velocity of ejection of the stream of water 310 can depend on the angular velocity of the device 110 and a direction of the stream of water 310 from the showerhead. The stream of water 310 can be accelerated towards the outer wall 205 once the stream of water 310 hits a surface. The surface can include the body of the user, the dividing wall 305, the outer wall 205, the side panel 208, and/or the inner wall 210.

The stream of water 310 can fall down the outer wall 205 following a water path 315. The water path 315 can be in contact with the outer wall 205. The water path 315 can be in contact with the dividing wall 305. The water path 315 can start on a point of the dividing wall 305 and end at a point of the outer wall 205. The water path 315 can guide water towards the outer wall 205.

The water path 315 can utilize three phenomena once it hits the accelerated frame: adhesion forces that can make water adhere to a surface such as the user and/or the dividing wall 305, surface tension which can keep water compact and from scattering, and/or centripetal acceleration which can guide water towards the outer wall 205 of the device 110 while in the accelerated frame of reference (e.g., while the device 110 is rotating). A relationship between the centripetal acceleration, the angular velocity of the device 110, the compartments 308, and a radius of the device 110 can be:

$$a = \frac{v^2}{r}$$

$$\text{where } v = r\omega$$

$$\text{so } a = r\omega^2.$$

a can be the centripetal acceleration, ω can be the angular velocity of the device 110, r can be a distance starting from the center point of the device 110, and v can be a tangential velocity at a given point at a distance r from a center of the device 110. $a=r\omega^2$ can show that centripetal acceleration can grow as it approaches the outer wall 205 since centripetal acceleration depends on a magnitude of the radius. A maximum radius can be a distance from the center point of the device 110 to the outer wall 205.

Figure 4:
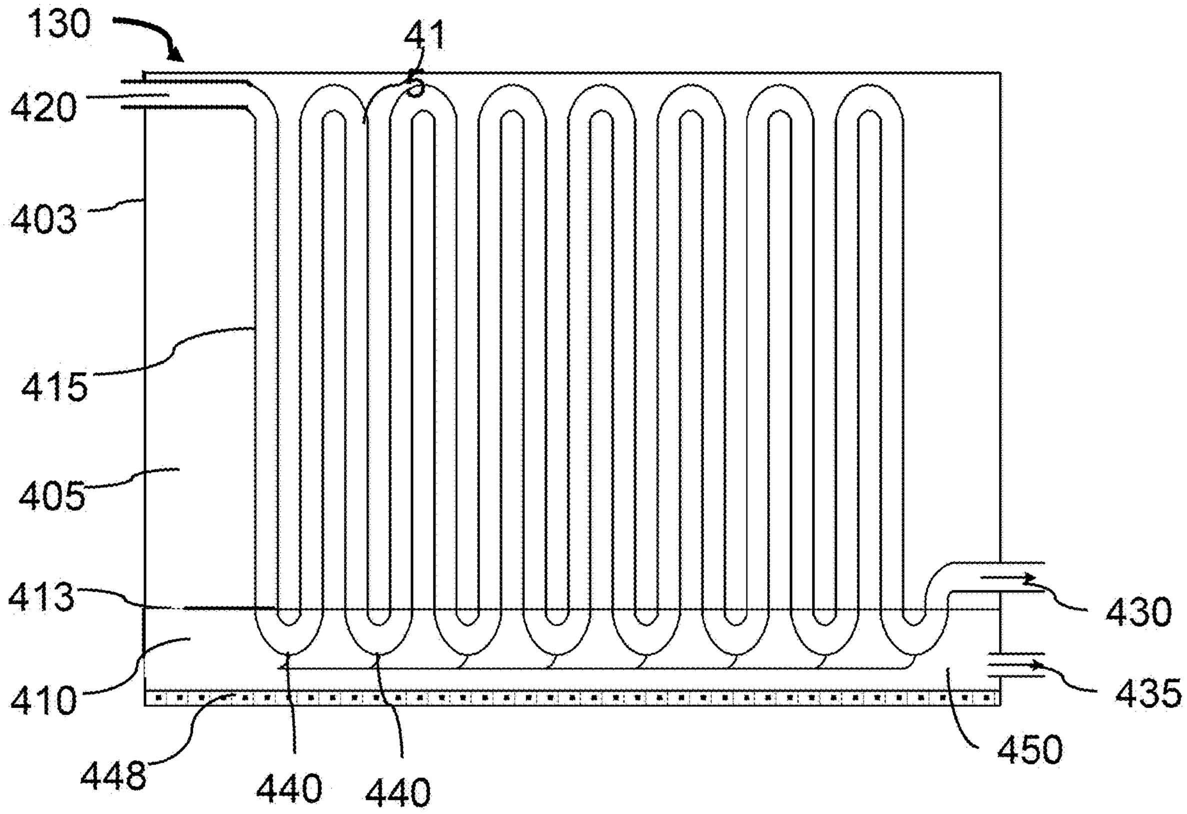
FIG. 4 is a condensation unit, according to an embodiment.

FIG. 4 depicts the water condensation unit 130. The water condensation unit 130 can be disposed in the compartments 308, coupled to the device 110, and/or coupled to at least one of the compartments 308. The water condensation unit 130 can be coupled by being connected to (e.g., a tube), attached to, and/or welded to the compartments 308 and/or the device 110. The water condensation unit 130 can condense, collect, and/or store water to be filtered and/or recycled to be used in the device 110. The water used by the device 110 can be continually, sequentially condensed and recycled. The temperature of water in the water condensation unit 130 can be kept above 32° F. For example, the temperature of the water can be kept slightly above freezing (e.g., 40° F.) to minimize evaporation.

The water condensation unit 130 can include one or more housings 403. For example, the water condensation unit 130 can include a housing 403. The housing 403 can include a material. The housing 403 can include plastic or metal. The housing 403 can have a shape. The housing 403 can have a generally rectangular shape. For example, the housing 403 can have a generally rectangular shape if the water condensation unit 130 is enclosed in a rotating spacecraft or apparatus. The housing 403 can be generally V-shaped. For example, the housing 403 can be generally V-shaped if the water condensation unit 130 is enclosed in a non-rotating spacecraft or apparatus.

The water condensation unit 130 can include one or more cooling and condensing portions 405. For example, the water condensation unit 130 can include a cooling and condensing portion 405. The cooling and condensing portion 405 can cool water vapors from the device 110. The cooling and condensing portion 405 can condense cool water vapors. The cooling and condensing portion 405 can be disposed in the housing 403. The cooling and condensing portion 405 can be disposed in an upper portion of the housing 403. The cooling and condensing portion 405 can include a cooling fluid (e.g., a fluid that can cool water vapors).

The water condensation unit 130 can include one or more draining portions 410. For example, the water condensation unit 130 can include a draining portion 410. The draining portion 410 can drain liquid water. The draining portion 410 can drain liquid water that has been condensed by the cooling and condensing portion 405. The draining portion 410 can be operatively coupled to the cooling and condensing portion 405. The draining portion 410 can be operatively coupled to the cooling and condensing portion 405 by water moving in and out of the draining portion 410 and the cooling and condensing portion 405. The draining portion 410 can be disposed in the housing 403. The draining portion 410 can be disposed in a lower portion of the housing 403. The draining portion 410 can be disposed below the cooling and condensing portion 405. The water can collect in the draining portion 410 due to artificial gravity generated by the centripetal acceleration of the device 110. The draining portion 410 can have a negligible condensation of gaseous water. The cooling and condensing portion 405 and the draining portion 410 can be hermetically sealed to each other.

The water condensation unit 130 can include one or more membranes 413. For example, the water condensation unit 130 can include a membrane 413. The membrane 413 can separate the cooling and condensing portion 405 from the draining portion 410. The membrane 413 can be disposed in the housing 403. The membrane 413 can be disposed between the cooling and condensing portion 405 and the draining portion 410. The membrane 413 can be a separation between the upper portion and the lower portion of the housing 403. The membrane 413 can include metal, a polymer, or any other material that can be water resistant. The membrane 413 can be a barrier. For example, the membrane 413 can be a barrier between the cooling and condensing portion 405 and the draining portion 410. The membrane 413 can hermetically seal the cooling and condensing portion 405 and the draining portion 410.

The water condensation unit 130 can include one or more condensation tubes 415. For example, the water condensation unit 130 can include a condensation tube 415. The condensation tube 415 can have a straight shape. The condensation tube 415 can have a helical shape as depicted in FIG. 4. The shape of the condensation tube 415 can be a shape that allows water to flow, driven by centripetal acceleration and adhesion forces, towards a portion of the segment of the condensation tube 415 disposed in the draining portion 410. The condensation tube 415 can be disposed in both the cooling and condensing portion 405 and the draining portion 410. The condensation tube 415 can have a first and a second segment. The first segment can be located (e.g., disposed) in the cooling and condensing portion 405 and the draining portion 410. The second segment can be located in the cooling and condensing portion 405 and the draining portion 410. The first segment can be located in the cooling and condensing portion 405 or the draining portion 410. The second segment can be located in the cooling and condensing portion 405 or the draining portion 410. The condensation tube 415 can have one or more segments. The condensation tube 415 can have multiple segments. The condensation tube 415 can include a material. The condensation tube 415 can include a material that can conduct heat and can keep water cold. Gaseous water can condense in the condensation tube 415 and transform from gaseous to liquid form.

The cooling and condensing portion 405 can include the condensation tube 415 and the cooling fluid. The cooling and condensing portion 405 can cool and start a condensation process of water vapors within the condensation tube 415. The cooling fluid can be configured to circulate around the condensation tube 415 to cool water vapors within the condensation tube 415. The water vapors can condense in the cooling and condensing portion 405 within the condensation tube 415. The draining portion 410 can include the condensation tube 415. Liquid water can drain from the condensation tube 415 within the draining portion 410. A first portion of the condensation tube 415 can be disposed in the cooling and condensing portion 405. A second portion of the condensation tube 415 can be disposed in the draining portion 410.

The water condensation unit 130 can include one or more inlets 420. For example, the water condensation unit 130 can include a condensation tube 415. The inlet 420 can be coupled to the condensation tube 415. The inlet 420 can be coupled to the segment of the condensation tube 415 disposed in the cooling and condensing portion 405. The inlet 420 can be coupled to the segment of the condensation tube 415 disposed in a top portion of the cooling and condensing portion 405. The inlet 420 can be coupled to the condensation tube 415 by welding or by being a portion of the condensation tube 415. Water vapors from the device 110 can be moved into the inlet 420 and the condensation tube 415 by a circulating device such as a fan. The inlet 420 can be coupled to the housing 403. The inlet 420 can be coupled to the housing 403 by being welded to, in contact with, and/or attached to the housing 403.

The water condensation unit 130 can include one or more first outlets 430. For example, the water condensation unit 130 can include a first outlet 430. The first outlet 430 can be coupled to the condensation tube 415. The first outlet 430 can be coupled to the segment of the condensation tube 415 disposed in the cooling and condensing portion 405. The first outlet 430 can be coupled to the condensation tube 415 by welding or by being a portion of the condensation tube 415. The first outlet 430 can be operatively coupled to the inlet 420. The first outlet 430 can be operatively coupled to the inlet 420 by being connected (e.g., attached) to the inlet 420. The first outlet 430 can be operatively coupled to the inlet 420 by gaseous water being directed out of the first outlet 430 to the inlet 420. Water vapors that move through the first outlet 430 can be moved back into the inlet 420. The first outlet 430 can be coupled to the housing 403. The first outlet 430 can be coupled to the housing 403 by being welded to, in contact with, and/or attached to the housing 403.

The water condensation unit 130 can include one or more second outlets 435. For example, the water condensation unit 130 can include a second outlet 435. The second outlet 435 can be coupled to the draining portion 410. The second outlet 435 can be coupled to the draining portion 410 by being welded to, in contact with, and/or attached to the draining portion 410. The second outlet 435 can be operatively coupled to the inlet 420. The second outlet 435 can be operatively coupled to the inlet 420 by water vapors moving from the second outlet 435 can be moved back into the inlet 420. The second outlet 435 can be operatively coupled to the inlet 420 by gaseous water being directed out of the second outlet 435 to the inlet 420. Water vapors that move through the second outlet 435 can be moved back into the inlet 420. The second outlet 435 can move back water vapors that escaped from the condensation tube 415. The gaseous water and air can be moved (e.g., sucked into, transferred) out through the second outlet 435. The second outlet 435 can be pointed towards the fans. The second outlet 435 can feed and/or move escaped gaseous to the inlet 420 to be re-condensed. The second outlet 435 can be coupled to the housing 403. The second outlet 435 can be coupled by being connected to, in contact with, and/or welded to the housing 403.

The water condensation unit 130 can include one or more openings 440. For example, the water condensation unit 130 can include an opening 440. The opening 440 can be a hole. The opening 440 can allow condensed water to fall (e.g., leak, drop out) of the condensation tube 415. The opening

440 can prevent condensed water to build up in the condensation tube 415. The first segment and the second segment of the condensation tube 415 can be separated by the opening 440. The condensed water can be collected, processed, and/or recycled by the water condensation unit 130. Gaseous water and air can escape (e.g., leak) from the openings 440. The opening 440 can have a diameter. The opening 440 can have a first opening and a second opening. The opening 440 can have multiple openings. The first opening can have a diameter smaller than the second opening. The diameter of the opening 440 can be determined by a rate of condensation. The diameter of the opening 440 can differ between the first opening and a second opening based on the rate of condensation of the first segment of the condensation tube 415 and the second segment of the condensation tube 415. For example, if the rate of condensation is lower in the first segment of the condensation tube 415 compared to the second segment of the condensation tube 415, the diameter of the opening 440 will be larger in the first segment of the condensation tube 415 compared to the second segment of the condensation tube 415. The opening 440 can be located between the first segment, the second segment, and the third segment of the condensation tube 415. The second outlet 435 can return gaseous air and water that escaped from the opening 440 to the inlet 420.

The opening 440 can be coupled to the condensation tube 415. The opening 440 can be coupled to the condensation tube 415 by being cut out from the condensation tube 415 and/or attached to the condensation tube 415. The opening 440 can be disposed in the draining portion 410. The opening 440 can be coupled to the segment of the condensation tube 415 disposed in the draining portion 410. Condensed water closer to the opening 440 can drain faster in comparison to condensed water disposed in the segment of the condensation tube 415 disposed in the cooling and condensing portion 405. The opening 440 can be disposed in the housing 403.

The water condensation unit 130 can include one or more portions of the draining portion 410 that collects water 448. For example, the water condensation unit 130 can include a portion of the draining portion 410 that collects water 448. The portion of the draining portion 410 that collects water 448 can herein be referred to as a pool of water 448. The pool of water 448 can be disposed in the draining portion 410. Liquid (e.g., condensed) water from the opening 440 can fall into the pool of water 448. The water vapors can condense in the draining portion 410 in the condensation tube 415 and liquid water can fall out of the condensation tube 415 from the opening 440 into the pool of water 448. A shape of the condensation tube 415 can be designed, configured, and/or adapted for condensed water to fall towards the pool of water 448 due to adhesion forces between liquid water and the condensation tube 415 and the centripetal acceleration of the device 110. The pool of water 448 can be disposed in the housing 403. The pool of water 448 can be disposed in the lower portion of the housing 403 in the draining portion 410.

The water condensation unit 130 can include one or more volumes of space 450. For example, the water condensation unit 130 can include a volume of space 450. The volume of space 450 can be disposed in the draining portion 410. The volume of space 450 can be around the opening 440. The gaseous water and air can escape into the volume of space 450 which can collect escaped gaseous water and air. The volume of space 450 can be disposed between the membrane 413 and the pool of water 448 and can collect gaseous air and water that can escape from the opening 440. The volume of space 450 can be disposed in the housing 403. The volume of space 450 can be disposed in the lower portion of the housing 403 in the draining portion 410. The volume of space 450 can have a volume equal to a volume of the draining portion 410. The volume of the volume of space 450 can be less than the volume of the draining portion 410.

A pressure of the cooling and condensing portion 405 can be kept higher than the draining portion 410 to increase a flow of condensed water through the condensation tube 415. Pressure can be raised and lowered periodically in pulses in periods long enough to squirt (e.g., force, move) condensed water out of the opening 440. The pressure can be equalized between the first portion and the second portion of the condensation tube 415 disposed in the cooling and condensing portion 405 and the draining portion 410. The first portion and the second portion of the condensation tube 415 can be hermetically sealed. The pulses of pressure can prevent gaseous water and air escaping from the opening 440. The pulses of pressure can allow for a lower angular velocity of the device 110 and a smaller diameter of the opening 440 compared to an environment with no pulses of pressure. The lower angular velocity can be above 0 radians per second. The lower angular velocity can be in a range of 0 to 1 radians per second. Extra pressure of the water in the pool of water 448 generated by pulses of pressure can be absorbed and/or isolated by a subsequent step of water recycling. The pressure can be generated by a pressure device (e.g., a piston, an air pump) coupled to the water condensation unit 130. The pressure device can be coupled by a tube, a nozzle, be in contact with, and/or welded to the water condensation unit 130. The pressure device can be coupled to the condensation tube 415. The pressure device can be coupled by a tube, a nozzle, be in contact with, and/or welded to the condensation tube 415. The pulses of pressure can be applied to the condensation tube 415.

Figure 5:
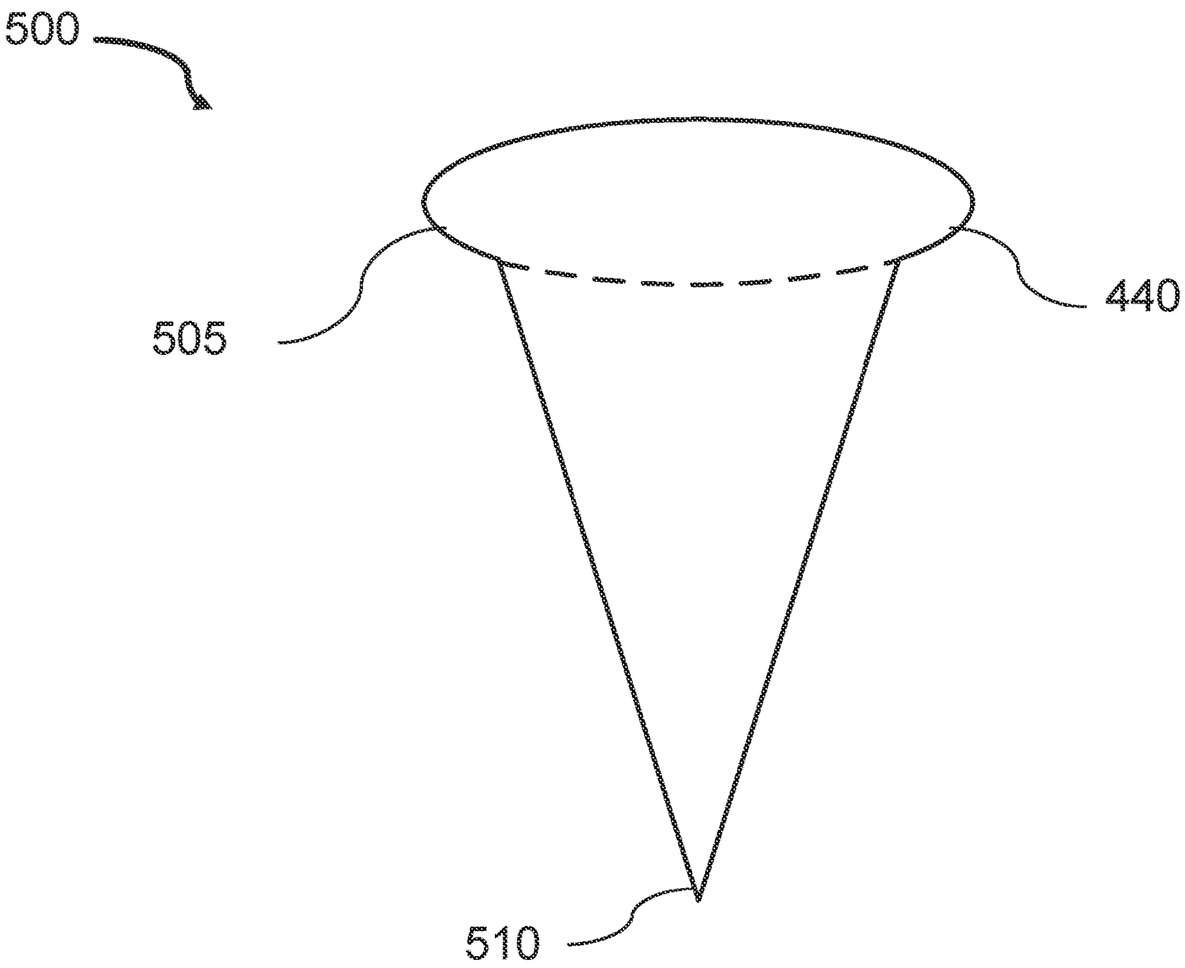
FIG. 5 is a protrusion from a hole within the condensation unit, according to an embodiment.

FIG. 5 depicts a protrusion 500 that can be coupled to the opening 440. The protrusion 500 can be coupled by being connected to, in contact with, and/or welded to the opening 440. The protrusion 500 can include a first diameter 505 which can correspond (e.g., align) to the opening 440, and a second diameter 510. The first diameter 505 can be coupled, connected to, in contact with, and/or welded to the opening 440. The second diameter 510 can be less than the first diameter 505. The second diameter 510 can be more than the first diameter 505. The second diameter 510 can be equal to the first diameter 505. The second diameter 510 can point towards the pool of water 448.

The protrusion 500 can be designed, configured, and/or adapted to reduce the surface tension which can prevent condensed water from flowing out of the opening 440 to the pool of water 448. The adhesion forces present at the first diameter 505 can draw the water towards the second diameter 510. The adhesion forces can overcome the surface tension which can allow for water to drain from the opening 440 at low angular velocities of the device 110. The low angular velocity can be 0.5 radians per second. The low angular velocity can be lower than 0.5 radians per second. Overcoming the surface tension can allow for the diameter of the opening 440 to be less than the diameter of the opening 440 coupled to the protrusion 500.

The protrusion 500 can be hydrophilic which can increase the adhesion forces of the protrusion 500. The protrusion 500 being hydrophilic can facilitate a flow of water which can reduce resistance generated by the surface tension at the opening 440, first diameter 505, and/or second diameter 510. The protrusion 500 can be hydrophilic by including a hydrophilic material such as acrylic. Reducing resistance generated by the surface tension can be overcome by surface activation of the protrusion 500. Surface activation of the protrusion 500 can be conducted (e.g., done) by applying an electrical charge (e.g., a negative or positive voltage) to the protrusion 500. The electrical charge can interact with a dipole moment of a water molecule. A negative charge of the protrusion 500 can attract positively polarized hydrogen atoms in the water molecule. A positive charge of the protrusion 500 can attract negatively polarized oxygen atoms in the water molecule. Increasing the adhesion forces can overcome resistance generated by the surface tension. Increasing the adhesion forces can facilitate the flow of water from the first diameter 505 to the second diameter 510 and down towards the pool of water 448. The second diameter 510 can be larger than the first diameter 505. The second diameter 510 being larger than the first diameter 505 can increase adhesion forces and draw water to the second diameter 510 from the condensation tube 415. The water can then separate from the second diameter 510 of the protrusion 500 and drop down to the pool of water 448.

Figure 6:
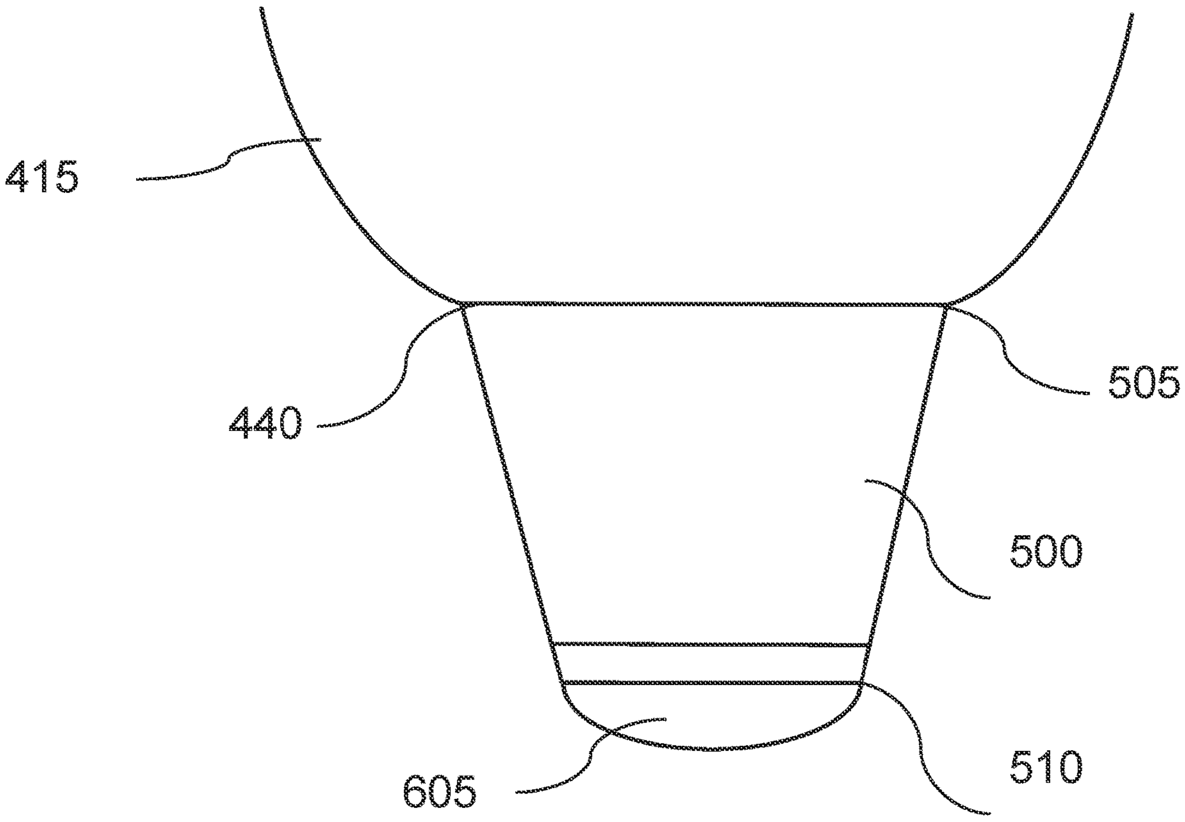
FIG. 6 is a side view of the protrusion from the hole of the condensation unit, according to an embodiment.

FIG. 6 depicts a cross-sectional view of the protrusion 500 coupled to the condensation tube 415. The protrusion 500 can be coupled by being connected to, in contact with, and/or welded to the condensation tube 415. The protrusion 500 can include a volume of water 605. The volume of water 605 can be a volume of water attached to the second diameter 510.

Gaseous water and air leaks can be avoided by using calculated pulses of pressure in the condensation tube 415. Pulses of pressure can be calculated by determining a pulsation, duration, and volume of water 605 displaced in the condensation tube 415 due to a pressure difference between the first and the second portions of the condensation tube 415 disposed in the cooling and condensing portion 405 and the draining portion 410. At equal pressures of the cooling and condensing portion 405 and the draining portion 410 and a low centripetal acceleration, the surface tension can prevent water from flowing through the second diameter 510 and accumulating in the volume of water 605. The low centripetal acceleration can be 1 meter per second squared. The volume of water 605 can accumulate within the protrusion 500. An increased applied pressure in the condensation tube 415 can move the water disposed in the protrusion 500 from the first diameter 505 to the second diameter 510 and towards the pool of water 448. The pulse of pressure can herein be referred to as a pressure pulse.

An intensity (e.g., amount) of the pressure pulse can be calculated to generate a force. The force be exerted on the water accumulated in the protrusion 500 to push the water through the protrusion 500 and to the pool of water 448. The pressure pulse can cause the water to have a velocity and kinetic energy as the water falls down towards the pool of water 448. The pressure pulse can be calculated to overcome a bonding force of the water molecules at the second diameter 510. The pressure pulse can be added to a force produced by the centripetal acceleration to move the water in the protrusion 500 left in the protrusion 500 and the volume of water 605. The pressure pulse can force (e.g., push, move) the water out and leave a residual amount of water in the protrusion 500 and/or the volume of water 605. The pressure pulse can prevent an escape of the gaseous water from the opening 440. The volume of water 605 can be a barrier that prevents gaseous water from escaping from the opening 440. The pressure in the first portion and the second portion of the condensation tube 415 disposed in the cooling and condensing portion 405 and the draining portion 410 can be equalized following a pressure pulse to force out water accumulated in the protrusion 500. One cycle can include a step including the equalized pressure, followed by the pressure pulse, followed by an equalizing of pressure. The cycle can repeat including the accumulation of water, forcing the accumulation of water out by a pressure pulse from the condensation tube 415, and then allowing water to accumulate again. The cycle can occur sequentially and periodically. The cycle can occur in one or more of the openings 440. The cycle can occur in each of the one or more openings 440.

Factors that can affect the flow of water out of the opening 440 can include adhesion forces, surface tension, and the diameter of the opening 440. Factors that can affect the flow of water out of the opening 440 can include the angular velocity of the device 110, a constant pressure difference between the cooling and condensing portion 405 and the draining portion 410, and a calculated pulsating pressure difference between the cooling and condensing portion 405 and the draining portion 410. Factors that can affect the flow of water out of the opening 440 can include the hydrophilic material of the protrusion 500, applying a constant, pulsating, and/or calculated voltage at the protrusion 500, and a slightly above freezing water temperature. The adhesion forces can attract the condensed water to walls of the protrusion 500. The adhesion forces can facilitate the flow of water. The surface tension can impede the flow of water through the opening 440. A larger diameter of the opening 440 (e.g., 1 cm) can be less affected by surface tension. A smaller diameter of the opening 440 (e.g., 1 mm) can increase surface tension and impede the flow of water. A higher angular velocity of the device 110 (e.g., 1.5 rad/s) can facilitate the flow of water while a lower angular velocity (e.g., 0.3 rad/s) can impede the flow of water. The constant pressure difference between the cooling and condensing portion 405 and the draining portion 410 can push water through the opening 440. The constant pressure difference can be determined and/or depend on the rate of condensation occurring within the condensation tube 415. The constant pressure difference between the cooling and condensing portion 405 and the draining portion 410 can allow gaseous water and air to escape from the opening 440. The pressure pulses can move condensed water through the opening 440 and minimize gaseous water and air escaping from the condensation tube 415. The hydrophilic material can increase adhesion forces and facilitate the flow of water through the protrusion 500. Applying a voltage can increase adhesion forces and facilitate the flow of water through the protrusion 500. The slightly above freezing water temperature can prevent evaporation of water in the water condensation unit 130.

Figure 7:
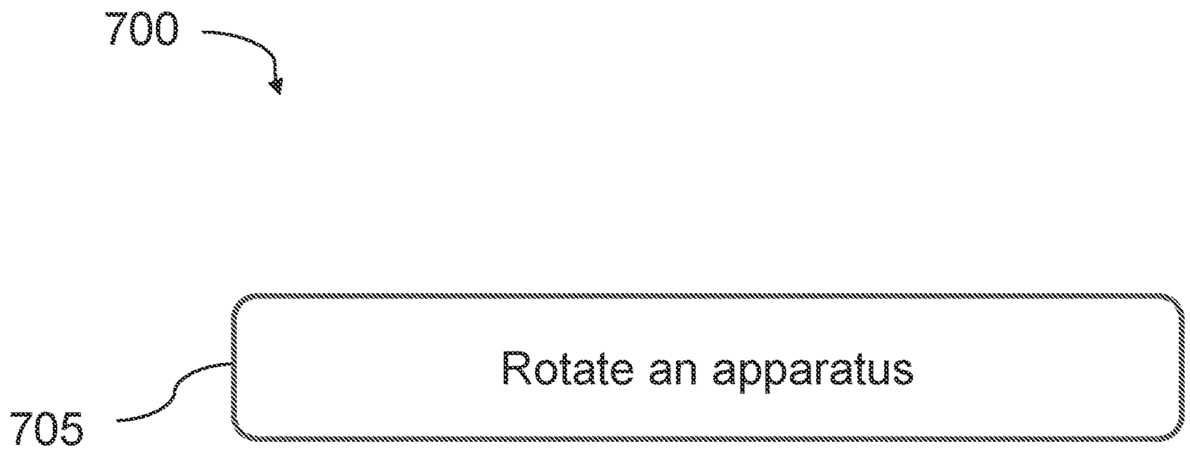
FIG. 7 is a flowchart of a method of rotating an apparatus, according to an embodiment.

FIG. 7 depicts a method 700. Various embodiments of the method 700 can be carried out automatically.

At 705, the apparatus can be rotated. The apparatus can include the power system 105, the device 110, the toilet 115, the shower 120, the washer dryer 125, the water condensation unit 130, and the balancing unit 135. The apparatus can be rotated by the power system 105 which can rotate the apparatus on an axis. The apparatus can be disposed in a craft. The craft can include a spacecraft and/or a vehicle. The craft can be located in a zero-gravity or micro-gravity environment. The apparatus can rotate itself via the power system 105. The craft can rotate the apparatus. For example, if the spacecraft is rotating, the apparatus can rotate as well. For example, if the spacecraft is rotating, the device 110 can be non-rotating.

Definitions

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," above, "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A system for generating centripetal acceleration to perform water-related activities, comprising:

a device, disposed in a craft, comprising an outer cylindrical wall coupled to a side panel and one or more walls, wherein the one or more walls form one or more compartments;

a water condensation unit coupled to the one or more compartments, the water condensation unit configured to condense gaseous water;

a balancing unit coupled to the device, the balancing unit configured to counteract an angular momentum imparted on the craft generated by the device; and a power unit coupled to the device, wherein the device moves liquid water to different portions of the device to counteract instantaneous changes of load.

2. The system of claim 1, comprising:

a shower disposed in the one or more compartments.

3. The system of claim 1, comprising:

at least one of a washer or dryer disposed in the one or more compartments.

4. The system of claim 1, comprising:

a toilet disposed in the one or more compartments.

5. The system of claim 1, wherein the water condensation unit, comprises:

a housing enclosing a cooling and condensing portion and a draining portion, the cooling and condensing portion and the draining portion separated by a membrane;

a condensation tube comprising a first segment and a second segment disposed within the housing;

an inlet coupled to the condensation tube;

a first outlet coupled to the condensation tube;

a second outlet coupled to the draining portion;

an opening disposed between the first segment of the condensation tube and the second segment of the condensation tube;

a portion of the draining portion that receives water from the opening; and one or more protrusions coupled with the opening.

6. The system of claim 5, wherein:

the cooling and condensing portion comprises a cooling fluid configured to circulate around a portion of the first segment of the condensation tube and a portion of the second segment of the condensation tube.

7. The system of claim 5, wherein the water condensation unit comprises:

one or more fans configured to move gaseous water and air into the inlet.

8. The system of claim 5, wherein the condensation tube conducts heat.

9. The system of claim 5, wherein the condensation tube has a straight shape.

10. The system of claim 5, wherein the condensation tube has a helical shape.

11. The system of claim 5, wherein the opening is a first opening and the condensation tube comprises a third segment and wherein the water condensation unit comprises:

a second opening disposed between the second segment of the condensation tube and the third segment of the condensation tube;

the first opening has a first diameter; and the second opening has a second diameter, the second diameter different from the first diameter.

12. The system of claim 5, wherein the one or more protrusions has a first diameter and a second diameter.

13. The system of claim 5, wherein the device is a first device and wherein a second device coupled to the condensation tube changes a pressure in the condensation tube.

14. The system of claim 5, wherein the one or more protrusions comprises hydrophilic material.

15. The system of claim 5, wherein the device is a first device and wherein a second device coupled to the condensation tube provides an electrical charge to the one or more protrusions.

16. The system of claim 5, wherein the water condensation unit comprises:

a volume of space disposed between the membrane and the portion of the draining portion that receives water and collects gaseous air and water that escapes from the opening.

17. A method of accelerating an object, comprising:

rotating, an apparatus comprising:

a device comprising an outer cylindrical wall coupled to a side panel and one or more walls, wherein the one or more walls form one or more compartments;

a water condensation unit coupled to the one or more compartments, the water condensation unit configured to condense gaseous water;

a balancing unit coupled to the device, the balancing unit configured to counteract an angular momentum imparted on the craft generated by the device; and a power system coupled to the device, wherein the device moves liquid water to different portions of the device to counteract instantaneous changes of load.

18. The method of claim 17, wherein the apparatus is disposed in a rotating craft.

19. The method of claim 18, wherein the rotating craft is a spacecraft.

* * * * *